US012641556B2

(12) United States Patent
Zhu et al.

(10) Patent No.: US 12,641,556 B2
(45) Date of Patent: May 26, 2026

(54) LTE-NR RELATIVE TIMING INDICATION

(71) Applicant: QUALCOMM Incorporated, San Diego, CA (US)

(72) Inventors: Xipeng Zhu, San Diego, CA (US); Arvind Vardarajan Santhanam, San Diego, CA (US); Luis Fernando Brisson Lopes, Swindon (GB); Neel Tej Adusumilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 17/998,024

(22) PCT Filed: Jun. 14, 2021

(86) PCT No.: PCT/US2021/037273
§ 371 (c)(1),
(2) Date: Nov. 4, 2022

(87) PCT Pub. No.: WO2021/257478
PCT Pub. Date: Dec. 23, 2021

(65) Prior Publication Data
US 2023/0180158 A1      Jun. 8, 2023

(30) Foreign Application Priority Data

Jun. 19, 2020      (IN) .............................. 202041025924

(51) Int. Cl.
*H04W 56/00* (2009.01)
*H04W 76/15* (2018.01)
(52) U.S. Cl.
CPC ....... *H04W 56/0015* (2013.01); *H04W 76/15* (2018.02)

(58) Field of Classification Search
CPC ............. H04W 56/0015; H04W 76/15; H04W 56/0055; H04W 76/16
See application file for complete search history.

(56) References Cited

U.S. PATENT DOCUMENTS 10,582,432 B2      3/2020  Park et al.
2015/0358945 A1*  12/2015  Susitaival ............. H04W 72/23
                                                   370/329
(Continued)

FOREIGN PATENT DOCUMENTS

CA          3051706 A1      2/2020
CN       110419235 A      11/2019
(Continued)

OTHER PUBLICATIONS

International Search Report and Written Opinion—PCT/US2021/037273—ISA/EPO—Nov. 9, 2021.
(Continued)

*Primary Examiner* — Charles C Jiang
(74) *Attorney, Agent, or Firm* — Paul M. McAdams; Shumaker & Sieffert, P.A.

(57)      ABSTRACT

Two or more base stations may share relative timing information. For example, a first cell may determining a cell level system frame number (SFN) and frame timing difference (SFTD) between the first cell and a second cell. At least one user equipment (UE) can be configured with dual connectivity with the first cell and the second cell. The first cell may send an indication of the cell level SFTD to the second cell via a backhaul with the second cell. The indication of the cell level SFTD may be the determined SFTD or a SFN reference time. In some implementations, the first cell may send a the SFTD measurement result and assistance information to the second cell via a backhaul to the second cell. The second cell may determine the cell level SFTD. In some (Continued)

implementations, a positioning network entity may determine the cell level SFTD.

28 Claims, 11 Drawing Sheets

(56) References Cited

U.S. PATENT DOCUMENTS

| | | | |
|---|---|---|---|
| 2018/0324645 A1 | 11/2018 | Park et al. | |
| 2019/0215136 A1 | 7/2019 | Zhou et al. | |
| 2019/0261234 A1 | 8/2019 | Park et al. | |
| 2019/0313272 A1* | 10/2019 | Zhou | H04W 24/10 |

FOREIGN PATENT DOCUMENTS

| | | | |
|---|---|---|---|
| EP | 3735049 A1 | 11/2020 | |
| WO | 2015115992 A1 | 8/2015 | |
| WO | WO-2019143937 A1 | 7/2019 | |
| WO | 2019162861 A1 | 8/2019 | |
| WO | 2021027876 A1 | 2/2021 | |

OTHER PUBLICATIONS

ETSI: "LTE, Evolved Universal Terrestrial Radio Access Network (E-Utran), X2 Application Protocol (X2AP) (3GPP TS 36.423 version 15.5.0 Release 15)", ETSI TS 136 423 v15.5.0, ETSI Technical Specification, European Telecommunications Standards Institute (ETSI), 650, Route Des Lucioles, F-06921 Sophia-Antipolis, France, vol. 3GPP Ran, No. V15.5.0, May 10, 2019, 420 Pages, XP014344919.

* cited by examiner

800

810

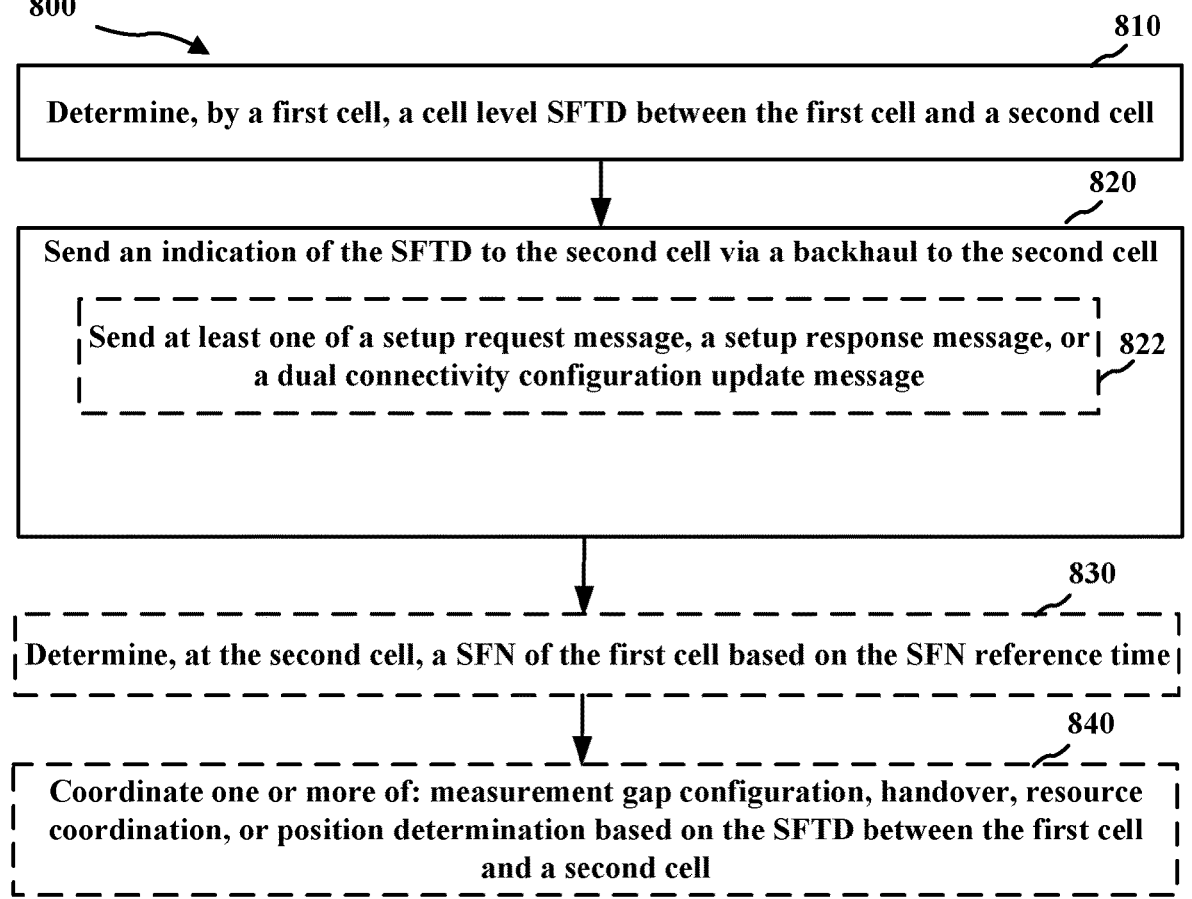

Determine, by a first cell, a cell level SFTD between the first cell and a second cell

820

Send an indication of the SFTD to the second cell via a backhaul to the second cell Send at least one of a setup request message, a setup response message, or a dual connectivity configuration update message    822

830

Determine, at the second cell, a SFN of the first cell based on the SFN reference time

840

Coordinate one or more of: measurement gap configuration, handover, resource coordination, or position determination based on the SFTD between the first cell and a second cell

FIG. 8

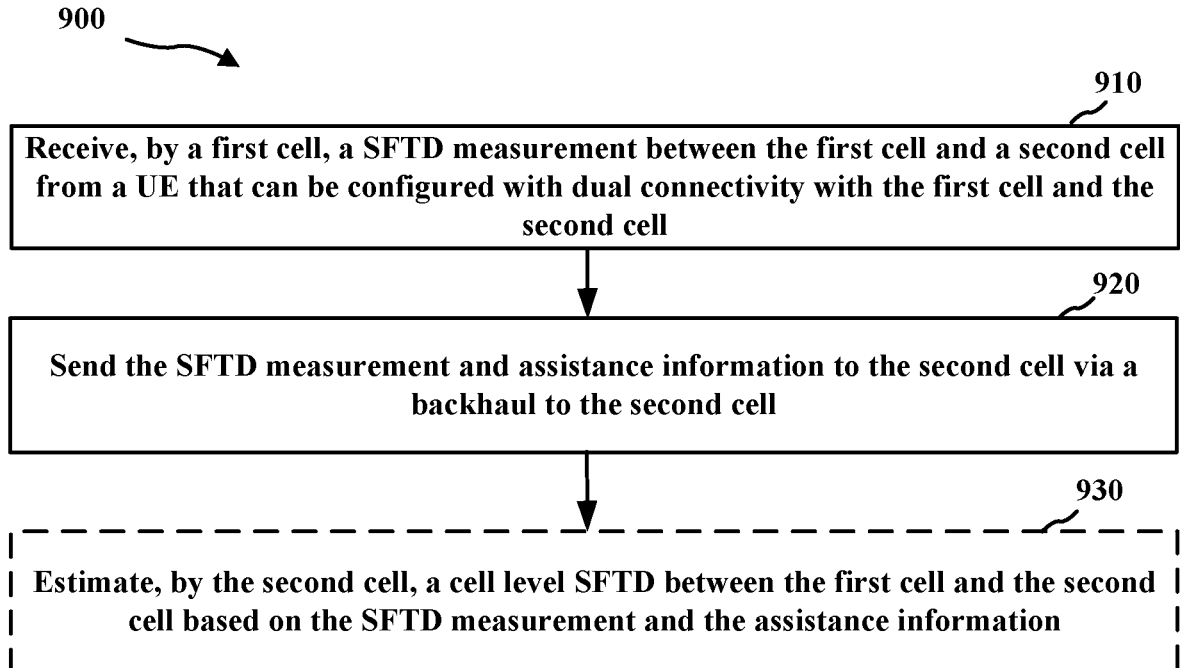

900

910

Receive, by a first cell, a SFTD measurement between the first cell and a second cell from a UE that can be configured with dual connectivity with the first cell and the second cell

920

Send the SFTD measurement and assistance information to the second cell via a backhaul to the second cell

930

Estimate, by the second cell, a cell level SFTD between the first cell and the second cell based on the SFTD measurement and the assistance information

FIG. 9

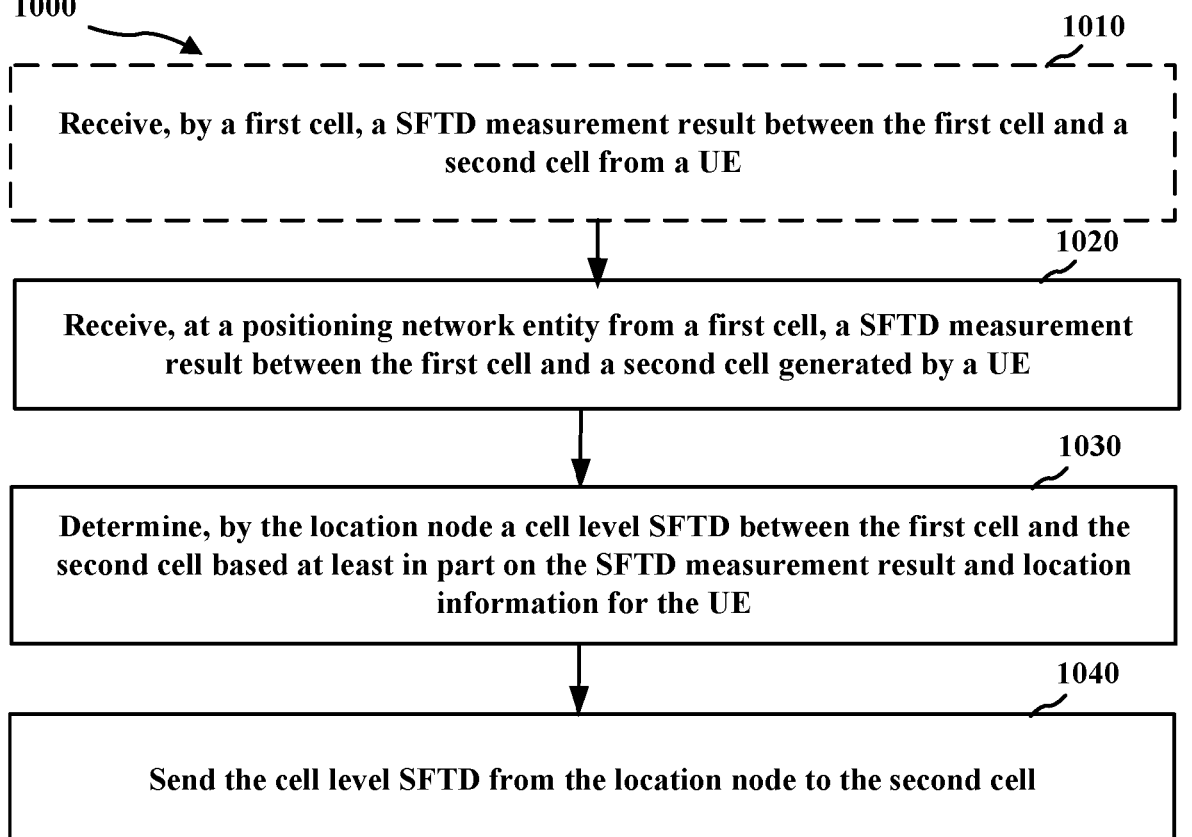

1000

1010

Receive, by a first cell, a SFTD measurement result between the first cell and a second cell from a UE

1020

Receive, at a positioning network entity from a first cell, a SFTD measurement result between the first cell and a second cell generated by a UE

1030

Determine, by the location node a cell level SFTD between the first cell and the second cell based at least in part on the SFTD measurement result and location information for the UE

1040

Send the cell level SFTD from the location node to the second cell

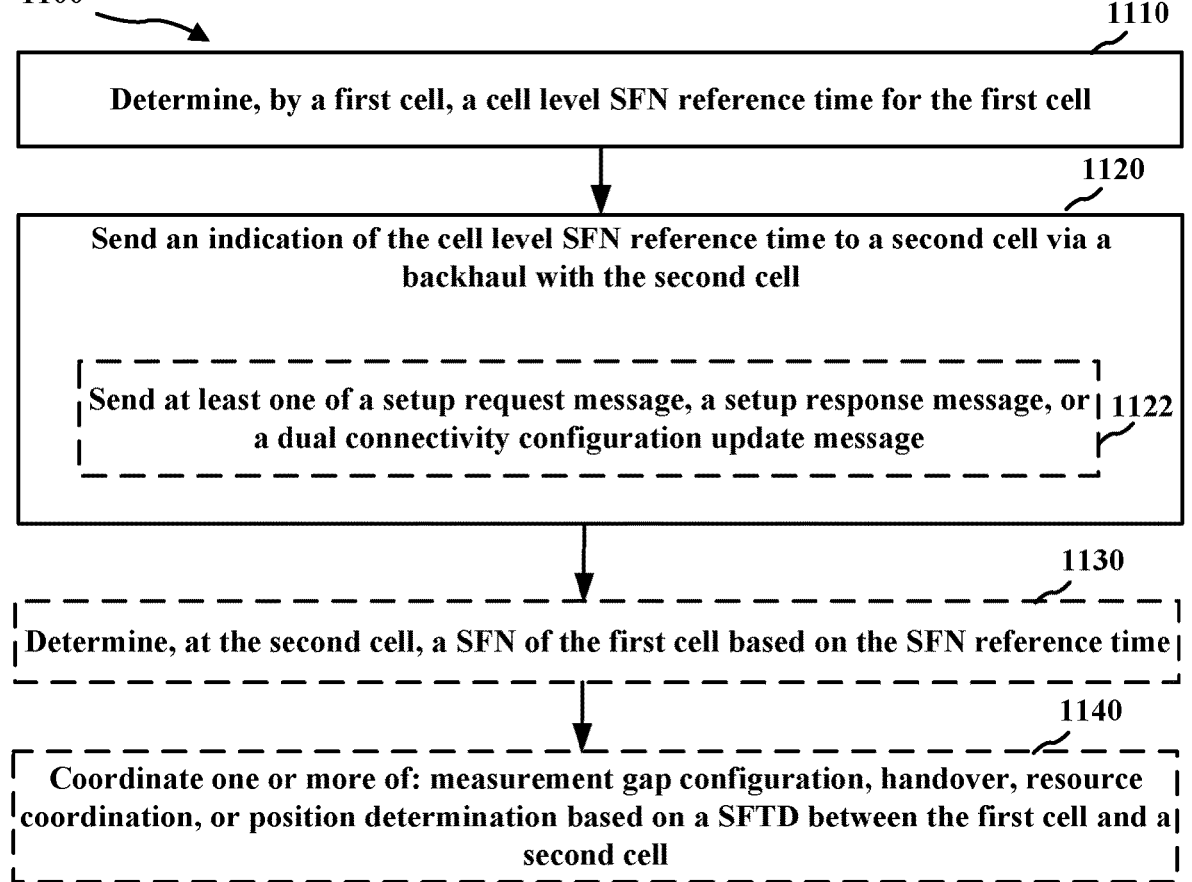

Determine, by a first cell, a cell level SFN reference time for the first cell

1120

Send an indication of the cell level SFN reference time to a second cell via a backhaul with the second cell Send at least one of a setup request message, a setup response message, or a dual connectivity configuration update message | 1122

1130

Determine, at the second cell, a SFN of the first cell based on the SFN reference time

1140

Coordinate one or more of: measurement gap configuration, handover, resource coordination, or position determination based on a SFTD between the first cell and a second cell

FIG. 11

LTE-NR RELATIVE TIMING INDICATION

CROSS REFERENCE TO RELATED APPLICATIONS

This application is a National Phase entry of PCT Application No. PCT/US2021/037273, entitled "LTE-NR RELATIVE TIMING INDICATION" and filed on Jun. 14, 2021, which claims priority to Indian Provisional Application No. 20/204,1025924, entitled "LTE-NR RELATIVE TIMING INDICATION" and filed on Jun. 19, 2020, both of which are expressly incorporated by reference herein in their entirety

BACKGROUND

Technical Field

The present disclosure relates generally to communication systems, and more particularly, to a relative timing indication between long term evolution (LTE) and new radio (NR) cells.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a network entity (e.g., a base station). The method may include determining, by a first cell, a cell level system frame number (SFN) and frame timing difference (SFTD) between the first cell and a second cell, wherein at least one user equipment (UE) is configured with dual connectivity with the first cell and the second cell. The method may include sending an indication of the cell level SFTD to the second cell via a backhaul with the second cell.

In some implementations, sending the indication of the cell level SFTD may include sending at least one of a setup request message, a setup response message, or a dual connectivity configuration update message. For example, sending the indication of the cell level SFTD may include sending an information element for the SFTD in one or more of a EN-DC X2 SETUP REQUEST message, an EN-DC X2 SETUP RESPONSE message, a EN-DC CONFIGURATION UPDATE message, an XN REQUEST message, an EX RESPONSE message, or an XN CONFIGURATION UPDATE message.

In some implementations, the indication of the cell level SFTD is the determined cell level SFTD.

In some implementations, the indication of the SFTD is a SFN reference time that is determined based, at least in part, on a common synchronization source of the first cell and the second cell. The SFN reference time may be determined based, at least in part, on a SFN reference time of the second cell. In some implementations, the method may further include determining, at the second cell, a SFN of the first cell based on the SFN reference time.

In some implementations, the method may further include coordinating one or more of: measurement gap configuration, handover, resource coordination, or position determination based on the cell level SFTD between the first cell and a second cell.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a base station. The method may include receiving, by a first cell, a SFTD measurement result between the first cell and a second cell from a user equipment (UE) that is configured with dual connectivity with the first cell and the second cell. The method may include sending the SFTD measurement result and assistance information to the second cell via a backhaul to the second cell.

In some implementations, the assistance information includes one or more of: a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE.

In some implementations, the method may further include estimating, by the second cell, a cell level SFTD between the first cell and the second cell based on the SFTD measurement result and the assistance information.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a positioning network entity. The method may include receiving, at a positioning network entity from a first cell, a SFTD measurement result between the first cell and a second cell generated by a UE. The method may include determining, by the positioning network entity, a cell level SFTD between the first cell and the second cell based at least in part on the SFTD measurement result and positioning information for the UE. The method may include sending the cell level SFTD from the positioning network entity to the second cell.

In some implementations, the positioning network entity is a location management function/component (LMF/LMC), reporting the SFTD measurement includes reporting via long term evolution (LTE) positioning protocol (LPP) signaling, and sending the cell level SFTD includes sending the cell level SFTD via new radio (NR) positioning protocol A (NRPPa) signaling.

In some implementations, the positioning network entity is an evolved serving mobile location center (E-SMLC), wherein reporting the SFTD measurement includes reporting via long term evolution (LTE) positioning protocol (LPP) signaling, and sending the cell level SFTD includes sending the cell level SFTD via LTE positioning protocol A (LPPa) signaling.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of an example method for communicating an indication of a cell level SFTD, in accordance with certain aspects of the present description.

FIG. 9 is a flowchart of an example method for communicating a UE SFTD measurement result between cells, in accordance with certain aspects of the present description.

FIG. 10 is a flowchart of an example method for determining a cell level SFTD using a positioning network entity, in accordance with certain aspects of the present description.

FIG. 11 is a flowchart of an example method for communicating an indication of a cell level SFN reference time, in accordance with certain aspects of the present description.

DETAILED DESCRIPTION

Figure 1:
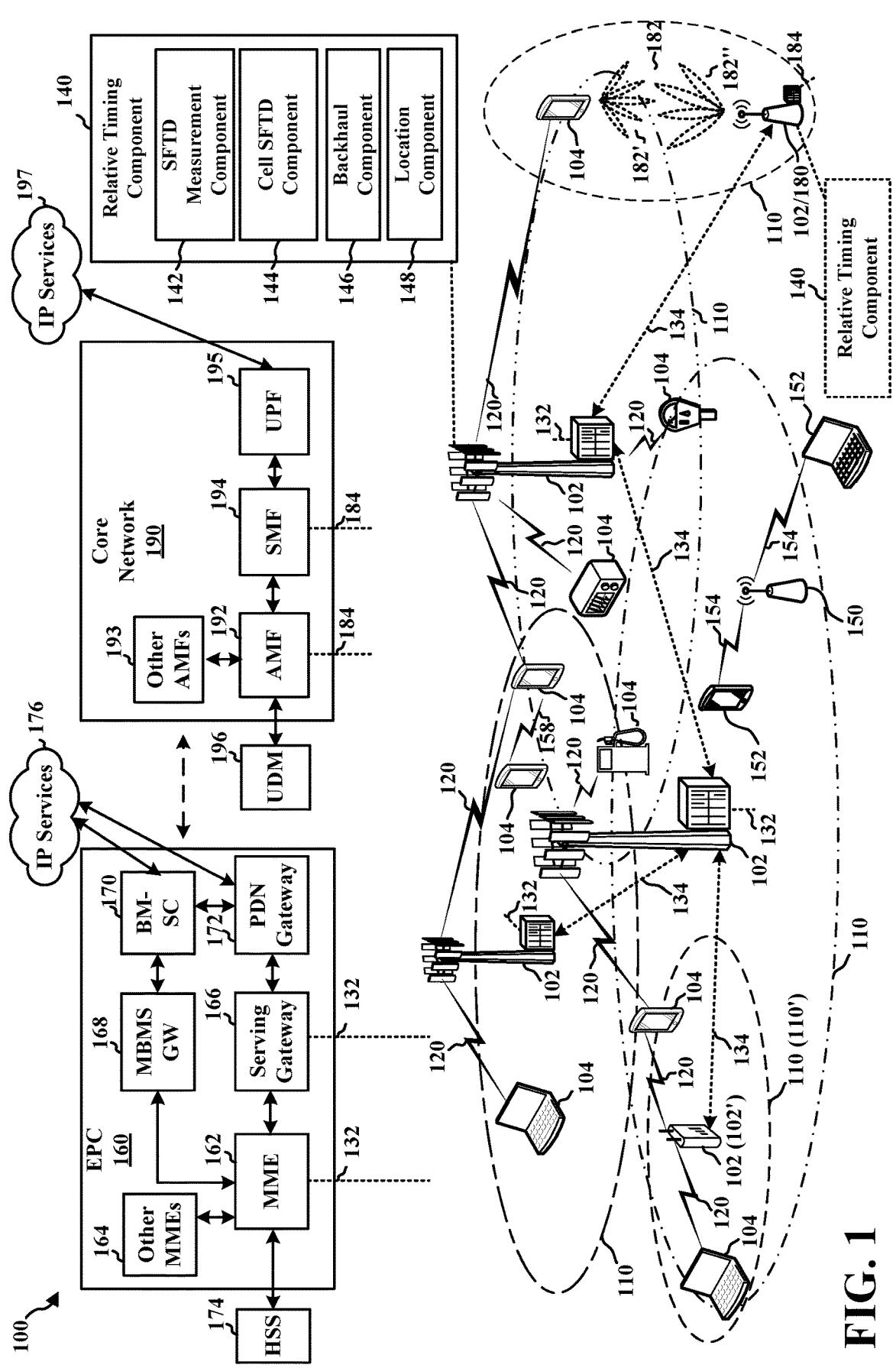
FIG. 1 is a diagram illustrating an example of a wireless communications system and an access network, in accordance with certain aspects of the present description.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Multiple-radio dual-connectivity (MR-DC) may allow a user equipment (UE) to communicate with two radio access networks, for example, utilizing two frequency bands. One radio network may be referred to as a master network (MN) and the other network may be referred to as the secondary network (SN). In some network deployments, which may be referred to as non-stand-alone (NSA) deployments, a 5G NR network may be deployed in conjunction with an LTE network. An example network deployment referred to as E-UTRA-NR Dual Connectivity (EN-DC) may include both LTE base station(s) (also referred to as eNB) and 5G NR base station(s) (also referred to as gNB) and an LTE core network referred to as an evolved packet core (EPC). An EN-DC network deployment may make use of existing LTE infrastructure for rapid deployment of 5G NR access network technology. Additionally, in some non-stand-alone 5G NR deployments such as EN-DC, some 4G LTE cells may serve as anchor cells for 5G NR access.

In some deployments, the radio frames of two or more cells may not be aligned and there may be a relative timing difference between two cells. The relative timing difference may be referred to as a system frame number (SFN) and frame timing difference (SFTD). For example, in some LTE frequency division duplexing (FDD) deployments, each cell may use a different timing to randomize interference. For MR-DC operation, coordination between cells may rely on coordinated timing. For example, a UE may be configured with measurement gaps to measure neighbor cells. If one of the cells in an MR-DC configuration does not have accurate timing information, the measurement gaps may not align with synchronization signals (e.g., synchronization signal block (SSB), primary synchronization signal (PSS), and/or secondary synchronization signal (SSS)) of the neighbor cells. Accordingly, the UE may experience measurement delay leading to a slow MR-DC configuration. Similarly, difficulty in measurements may lead to downgraded mobility performance due to measurement latency or missed measurements. Downgraded throughput may result from missed scheduling opportunities during measurement gaps. As another example, MR-DC operation may utilize single uplink operation and spectral sharing, which may rely on accurate relative timing information.

In conventional networks, there are two techniques for a cell to acquire cell level relative timing. First, the operator configuration may set a SFTD between all cells in an area. In particular, for time domain duplexing (TDD)-TDD deployments, the SFTD may be fixed by the operator configuration. In FDD-TDD deployments, however, different FDD cells may have different timing. Further, a network deployment may utilize equipment from different vendors (e.g., for LTE and NR). Accordingly, an SFTD based on operator configuration may not be available or reliable. Second, one or more UEs may provide an SFTD measurement to either an LTE cell or a NR cell. Cell level LTE-NR relative timing may be estimated based on the SFTD measurements. SFTD measurement reporting, however, is an optional feature and may not be provided by all UEs. Additionally, UE SFTD measurement accuracy is impacted by a location of the UE. Accordingly, the accuracy of the cell level relative timing estimation may depend on additional information regarding the location of the UE. In view of the foregoing, there is a need for improved techniques for relative timing acquisition.

In an aspect, the present disclosure provides techniques for communication of relative timing information between network nodes. For example, in some implementations, base stations such as eNBs and/or gNBs may communicate the relative timing information via a backhaul such as an X2 interface or an Xn interface. As another example, in some implementations, the base stations may communicate with a position network entity, which may estimate relative timing information and provide an indication of the relative timing information to one or more of the base stations. Although some of the examples described herein relate to a dual connectivity scenario, the disclosed techniques may be generally applicable for communicating relative timing information.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the base stations 102/180 may include a relative timing component 140 that sends or receives relative timing information with one or more other network entities. The relative timing component 140 may include a SFTD measurement component 142 configured to receive a SFTD measurement result between the first cell and a second cell from a UE 104 that is configured with dual connectivity with the first cell and the second cell. The relative timing component 140 may include a cell SFTD component 144 configured to determine a cell level SFTD between the first cell and a second cell. The relative timing component 140 may include a backhaul component 146 configured to send an indication of the cell level SFTD to the second cell via a backhaul with the second cell. In some implementations, the backhaul component may be configured to receive an indication of the cell level SFTD when the base station 102/108 provides the second cell. The relative timing component 140 may include a location component 148 configured to report a SFTD measurement to a positioning network entity.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC

160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

Figures 2A, 2B, 2C, 2D:
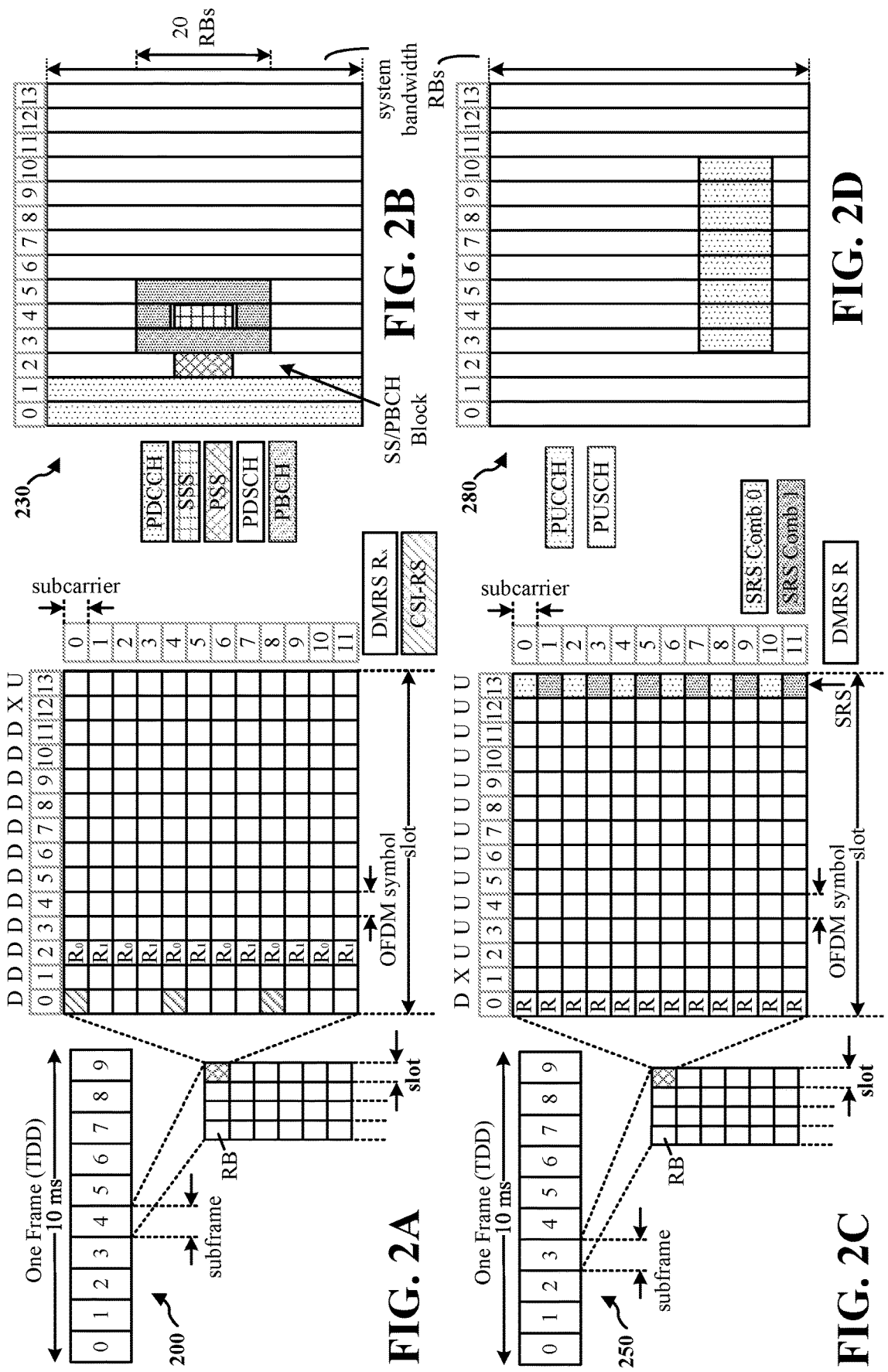
FIG. 2A is a diagram illustrating an example of a first frame, in accordance with certain aspects of the present description.
FIG. 2B is a diagram illustrating an example of DL channels within a subframe, in accordance with certain aspects of the present description.
FIG. 2C is a diagram illustrating an example of a second frame, in accordance with certain aspects of the present description.
FIG. 2D is a diagram illustrating an example of a subframe, in accordance with certain aspects of the present description.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G/NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios;

limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
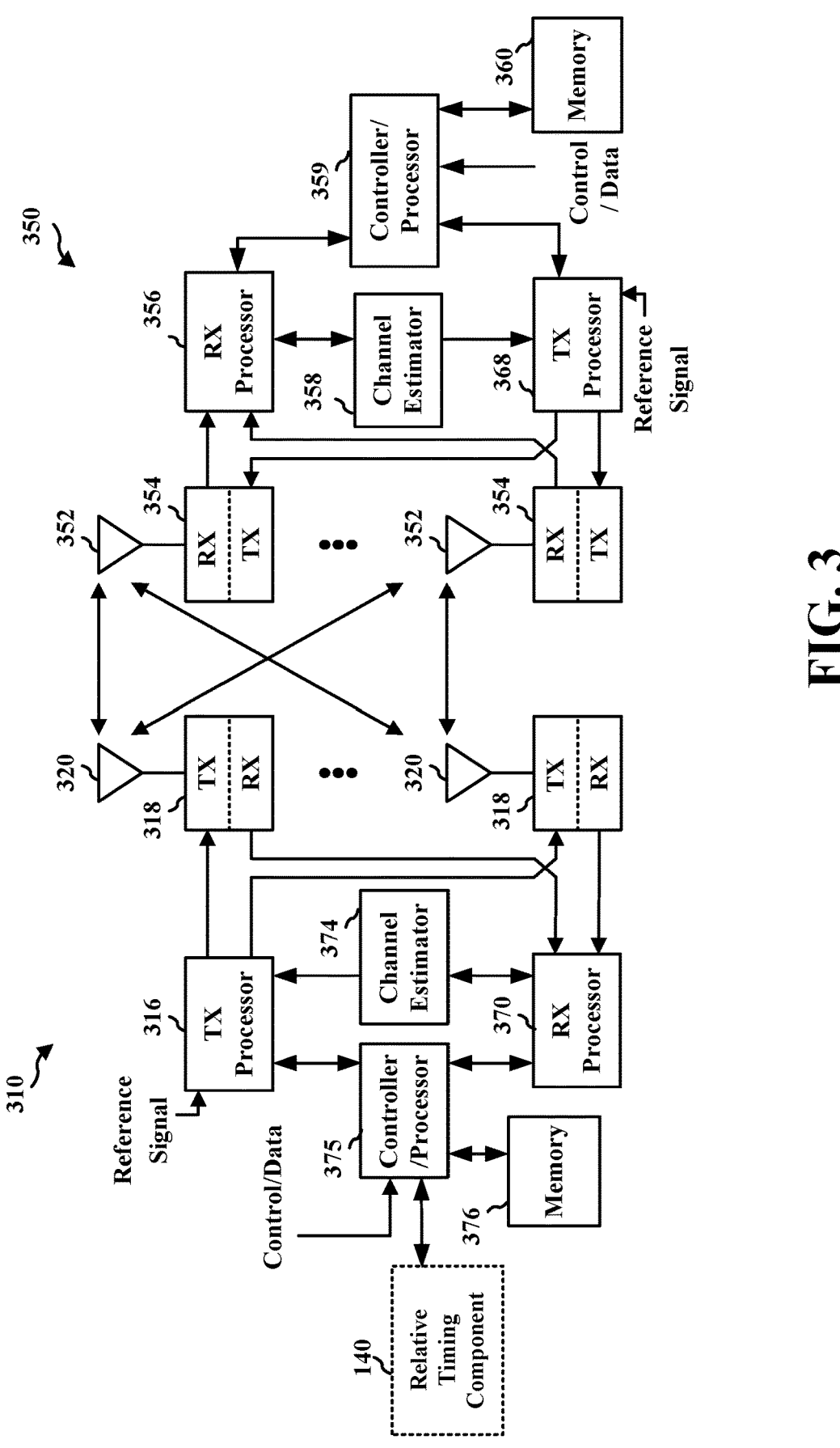
FIG. 3 is a diagram illustrating an example of a base station and user equipment (UE) in an access network, in accordance with certain aspects of the present description.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with the relative timing component 140 of FIG. 1.

Figure 4:
FIG. 4 is a diagram illustrating example communications between a UE, an LTE cell, and a NR cell 420 for communicating an indication of a cell level SFTD, in accordance with certain aspects of the present description.

FIG. 4 is a diagram 400 illustrating example communications between a UE 104, an LTE cell 410 (e.g., an eNB), and a NR cell 420 (e.g., a gNB) for communicating an indication of a cell level SFTD. As mentioned above, the UE 104 may optionally provide an SFTD measurement 430 to the LTE cell 410 and/or the NR cell 420. In block 440, a first cell (e.g., LTE cell 410) may determine a cell level SFTD. In some implementations, the LTE cell 410 may be able to determine a cell level SFTD while the NR cell 420 is unable to determine the cell level SFTD on its own. For example, as discussed above, the SFTD measurements 430 may be optional. Additionally, an NR access network may be a TDD deployment having a fixed frame timing. In some deployments, the frame timing and SFN of an NR cell may be based on a default SFN reference time (e.g., a common reference time of 1980-01-06T00:00:19 in international atomic time (TAI)). Accordingly, even if SFTD measurements 430 from a UE 104 are not available, the LTE cell 410 may be able to determine a cell level SFTD between the LTE cell 410 and the NR cell 420 based on the default SFN reference time.

The LTE cell 410 may transmit an indication of the cell level SFTD (e.g., LTE-NR SFTD Indication 450) via a backhaul (e.g., backhaul link 134 in FIG. 1). In some implementations, the indication of the cell level SFTD may be the cell level SFTD 452 determined by the LTE cell 410. In some implementations, the indication of the cell level SFTD may be a SFN reference time 454 that is determined based, at least in part, on a common synchronization source of the first cell and the second cell (e.g., global navigational satellite system (GNSS), a satellite based navigation system (SNS) or global positioning system (GPS) signal). For instance, the SFN reference time may be an offset between the SFN 0 of the first cell and the common reference time according to the common synchronization source. In some implementations, the SFN reference time is determined based, at least in part, on a SFN reference time of the second cell. For example, the SFN reference time of the NR cell 420 may be the default SFN reference time, or may be signaled by the NR cell 420. In some implementations, where the NR cell 420 receives the SFN reference time of the LTE cell 410, at block 460, the NR cell 420 may determine a relative timing of the first cell based on the SFN reference time. Accordingly, the second cell may determine the cell level SFTD based on the indication of the cell level SFTD.

The backhaul link 134 may be, for example, an X2 interface or an Xn interface. The indication of the cell level SFTD may be an information element in a message transmitted over the X2 interface or the Xn interface. Example messages that may include the information element for the cell level SFTD are: a setup request message, a setup response message, or a dual connectivity configuration update message. For example, on the X2 interface, the information element may be included in one or more of: a EN-DC X2 SETUP REQUEST message, an EN-DC X2 SETUP RESPONSE message, or a EN-DC CONFIGURATION UPDATE message. As another example, on the Xn interface, the information element may be included in one or more of: an XN REQUEST message, an XN SETUP RESPONSE message, or an XN CONFIGURATION UPDATE message. Either the X2 interface or the Xn interface may be extended to include an information element for the cell level SFTD 452. For the SFN reference time 454, the X2 interface or the Xn interface may be extended to include an information element for the SFN reference time 454. For example, a LTE positioning protocol A (LPPa) defines a SFN initialization time information element that may be added to the X2 interface or the Xn interface. The SFN initialization time may be defined relative to an absolute reference time (e.g., 00:00:00 on 1 Jan. 1900). In some implementations, dual connectivity may be established after EN-DC X2 setup. Accordingly, a UE can be configured for dual connectivity with the first cell and the second cell after the backhaul is established. In other words, the eNB/gNB and X2 interface support EN-DC.

Figure 5:
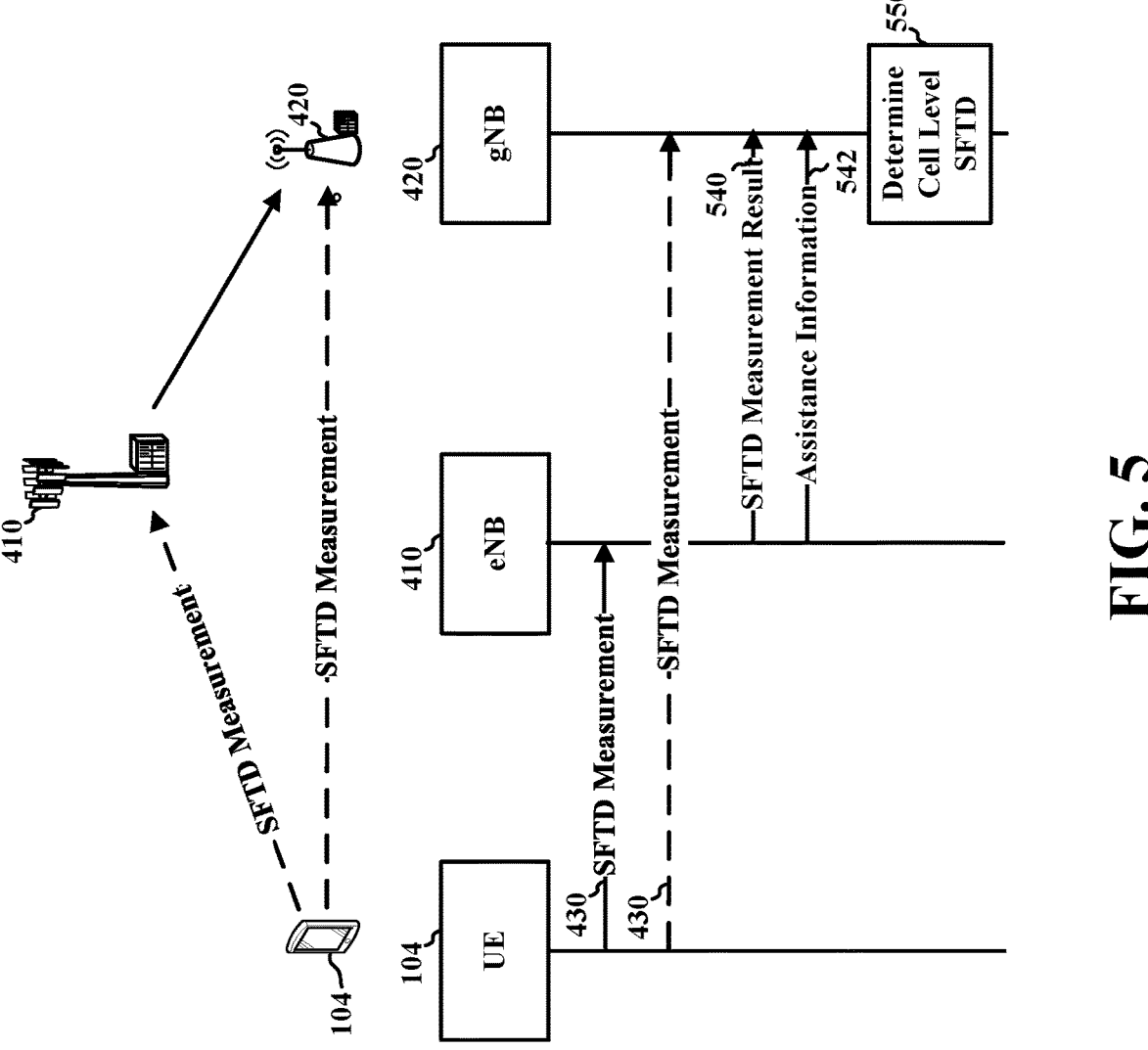
FIG. 5 is a diagram illustrating example communications between a UE, an LTE cell, and a NR cell for communicating an SFTD measurement result, in accordance with certain aspects of the present description.

FIG. 5 is a diagram 500 illustrating example communications between a UE 104, an LTE cell 410 (e.g., an eNB), and a NR cell 420 (e.g., a gNB) for communicating an SFTD measurement result. As mentioned above, the UE 104 may optionally provide an SFTD measurement 430 to the LTE cell 410 and/or the NR cell 420. In this case, the LTE cell 410 may receive the SFTD measurement 430 from the UE 104 that is configured with dual connectivity with the first cell (e.g., LTE cell 410) and the second cell (e.g., NR cell 420). The LTE cell 410 may send an SFTD measurement result 540 to the NR cell 420 via a backhaul (e.g., backhaul link 134 in FIG. 1). The SFTD measurement result 540 may include the SFTD measurement 430. The LTE cell 410 may also send assistance information 542 to the NR cell 420. The assistance information 542 may include one or more of a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE. The SSB identifier may indicate a direction of a beam from the LTE cell 410 to the UE 104. The TRP location may indicate a position of one or more antennas that transmitted the SSB (e.g., a position of the LTE cell 410). The angle of arrival may indicate a direction from the UE 104 to the LTE cell 410. The timing advance of the UE may be used to determine a distance between the UE 104 and the LTE cell 410. The SRS/PRS configuration may allow the NR cell 420 to measure a reference signal of the UE 104 to determine a position of the UE 104 with respect to the NR cell 420. In block 550, the NR cell 420 may estimate a cell level SFTD between the LTE cell 410 and the NR cell 420 based on the SFTD measurement result 540 and the assistance information 542. Accordingly, the second cell may determine the cell level SFTD even if the UE 104 does not provide an SFTD measurement 430 to the second cell.

Figure 6:
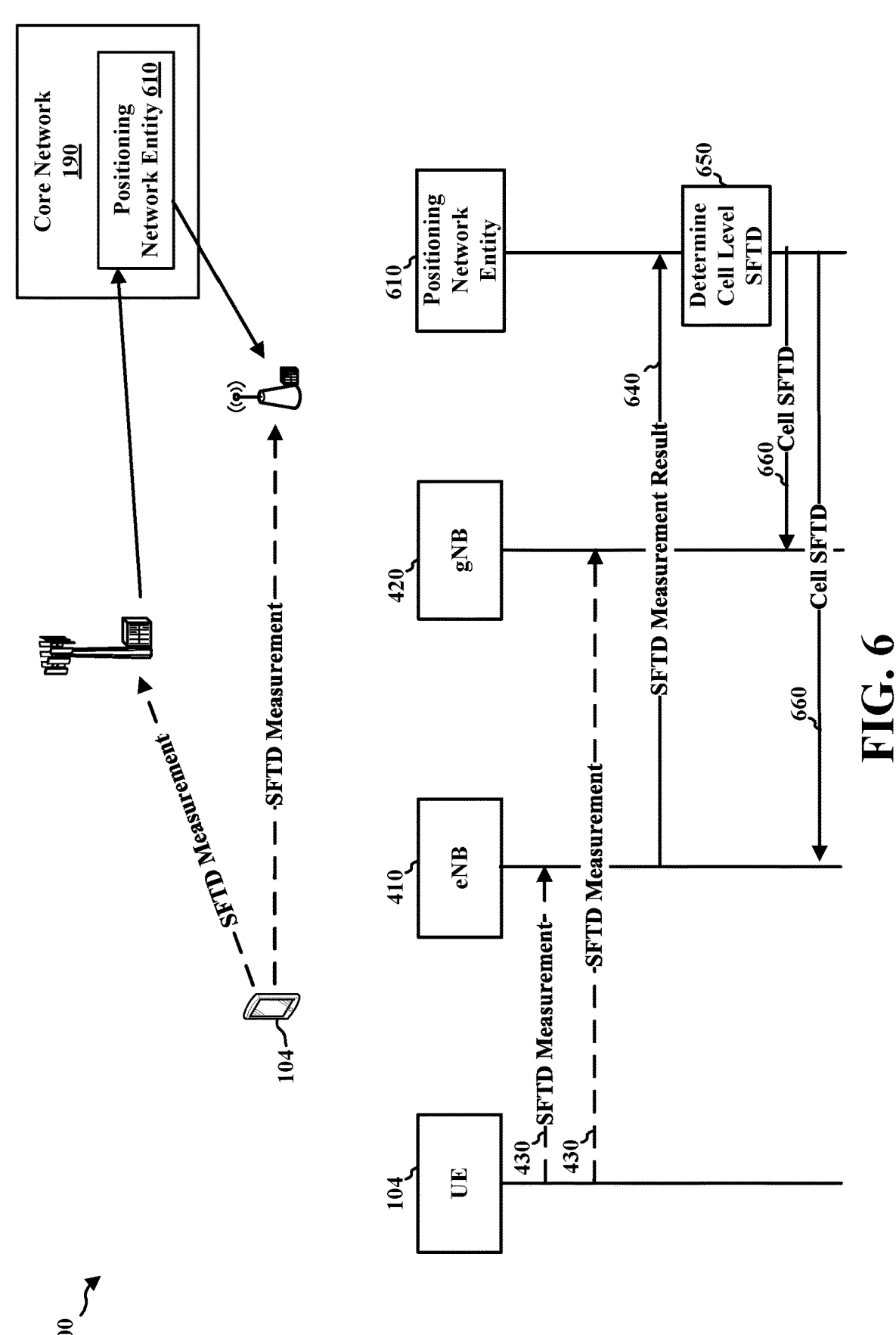
FIG. 6 is a diagram illustrating example communications between a UE, an LTE cell, a NR cell, and a positioning network entity for communicating a cell level SFTD, in accordance with certain aspects of the present description.

FIG. 6 is a diagram 600 illustrating example communications between a UE 104, an LTE cell 410 (e.g., an eNB), a NR cell 420 (e.g., a gNB), and a positioning network entity 610 for communicating a cell level SFTD. The positioning network entity 610 may be a network entity within a core network such as the core network 190 or the EPC 160. For example, the positioning network entity 610 may be a location management function/component (LMF/LMC) in the core network 190 or a evolved serving mobile location center (E-SMLC) in the EPC 160. UE 104 may or may not be configured for dual connectivity with the eNB 410 and the gNB 420. The eNB 410 and the gNB 420 may not have an established backhaul. As mentioned above, the UE 104 may optionally provide an SFTD measurement 430 to the LTE cell 410 and/or the NR cell 420. In this case, the LTE cell 410 may receive the SFTD measurement 430 from the UE 104. The LTE cell 410 may report an SFTD measurement result 640 to the positioning network entity 610 via a backhaul (e.g., backhaul link 132 or backhaul link 184 in FIG. 1). For example, the LTE cell 410 may use LTE positioning protocol (LPP) signaling to report the SFTD measurement result. The SFTD measurement result 540 may include the SFTD measurement 430. At block 650, the positioning network entity 610 may determine a cell level SFTD between the first cell and the second cell based at least in part on the SFTD measurement and positioning information for the UE 104. The positioning network entity 610 may send the cell level SFTD 660 to the NR cell 420 and/or the LTE cell 410. For example, the positioning network entity 610 may send the cell level SFTD to the NR cell 420 via NR positioning protocol A (NRPPa) signaling. As another example, the positioning network entity 610 may send the cell level SFTD to the LTE cell 410 via LTE positioning protocol A (LPPa) signaling.

Figure 7:
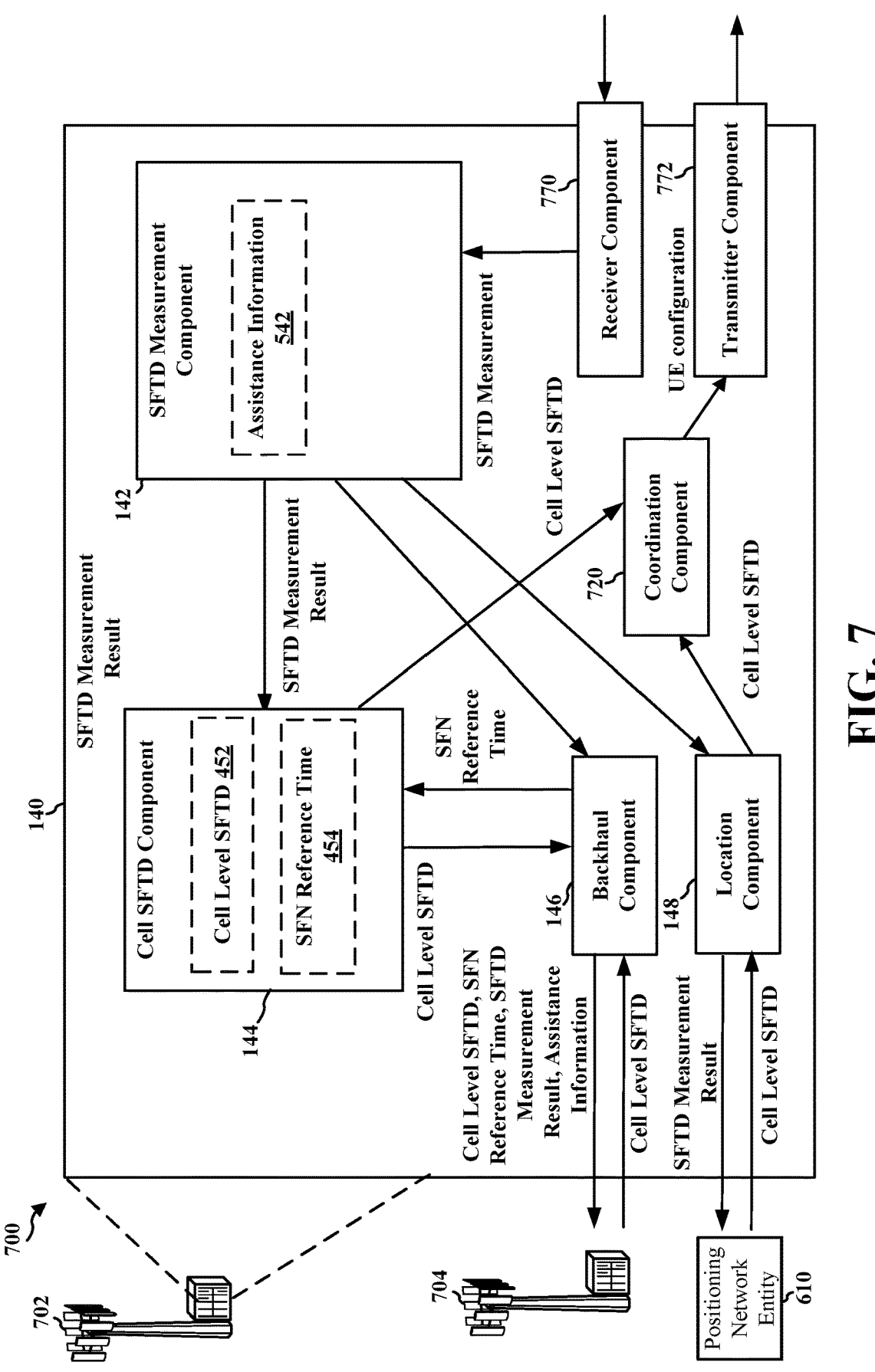
FIG. 7 is a conceptual data flow diagram illustrating the data flow between different means/components in an example base station, in accordance with certain aspects of the present description.

FIG. 7 is a conceptual data flow diagram 700 illustrating the data flow between different means/components in an example base station 702. The base station 702 may be an example of the base station 102 or the base station 180. The base station 702 may include the relative timing component 140. The base station 702 may provide one of the LTE cell 410 or the NR cell 420. Another base station 704 including a relative timing component 140 may provide the other of the LTE cell 410 or the NR cell 420.

As discussed above regarding FIG. 1, relative timing component 140 may include one or more of the SFTD measurement component 142, the cell SFTD component 144, the backhaul component 146, or the location component 148. relative timing component 140 may also include a receiver component 770 and a transmitter component 772. The receiver component 770 may include, for example, a radio-frequency (RF) receiver for receiving the signals described herein. The transmitter component 772 may include for example, an RF transmitter for transmitting the signals described herein. In an aspect, the receiver component 770 and the transmitter component 772 may be co-located in a transceiver.

The receiver component 770 may receive an SFTD measurement from one or more UEs 104. The receiver component 770 may provide the SFTD measurement to the SFTD measurement component 142.

The SFTD measurement component 142 may receive the SFTD measurement from the UE 104. The SFTD measurement component 142 may determine assistance information 542 based on the SFTD measurement and/or other measurements. For example, the SFTD measurement component may determine one or more of the SSB identifier used for the SFTD measurement, the transmission-reception point (TRP) location for the SSB, an angle of arrival used for the SFTD measurement, a timing advance of the UE 104, a SRS configuration of the UE, or a PRS configuration of the UE 104. The SFTD measurement component 142 may provide the SFTD measurement result to one or more of the cell SFTD component 144, the backhaul component 146, or the location component 148. The SFTD measurement component 142 may provide the assistance information 542 to the backhaul component 146.

The cell SFTD component 144 may receive the SFTD measurement result from the SFTD measurement component 142. The cell SFTD component 144 may be configured with a network timing configuration. For example, the cell SFTD may be configured with a SFN reference time 454. In some implementations, the cell SFTD component 144 may determine a cell level SFTD 452 based on the SFN reference time 454 and/or SFTD measurement result. The cell SFTD component 144 may provide the cell level SFTD 452 to the backhaul component 146. In some implementations, the cell SFTD component 144 may provide the SFN reference time 454 to the backhaul component 146 as an indication of the cell level SFTD.

In some implementations, the backhaul component 146 may receive the cell level SFTD 452 from the cell SFTD component. In some implementations, the backhaul component 146 may receive the SFN reference time 454 from the cell SFTD component. In some implementations, the backhaul component 146 may receive the SFTD measurement result and assistance information 542 from the SFTD measurement component 142. The backhaul component 146 may send one or more of the cell level SFTD 452, the SFN reference time 454, the SFTD measurement result, or the assistance information 542 to the base station 704 via a backhaul. In some implementations, where the base station 702 provides the second cell (e.g., NR cell 420), the backhaul component 146 may receive one or more of the cell level SFTD 452, the SFN reference time 454, the SFTD measurement result, or the assistance information 542 for a first cell (e.g., LTE cell 410) from the base station 704.

In some implementations, the location component 148 may receive the SFTD measurement result from the SFTD measurement component 142. The location component 148 may report the SFTD measurement result to the positioning network entity 610. The location component 148 may receive a cell level SFTD from the positioning network entity 610.

In some implementations, the relative timing component 140 may include a coordination component 720. The coordination component 720 may receive the cell level SFTD for another cell from any of the cell SFTD component 144, the backhaul component 146, or the location component 148. The coordination component 720 may coordinate one or more of: measurement gap configuration, handover, resource coordination, or position determination based on the cell level SFTD between the first cell and a second cell. For example, the coordination component 720 may transmit a UE configuration to the UE 104 via the transmitter component 772. The UE configuration may include, for example, measurement gaps based on the cell level SFTD.

FIG. 8 is a flowchart of an example method 800 for communicating an indication of a cell level SFTD. The method 800 may be performed by one or more base stations (such as the base station 102, which may include the memory 376 and which may be the entire base station 102 or a component of the base station 102 such as the relative timing component 140, TX processor 316, the RX processor 370, or the controller/processor 375). The method 800 may be performed by the relative timing component 140 at a first cell in communication with a relative timing component 140 at a second cell.

At block 810, the method 800 may include determining, by a first cell, a cell level SFTD between the first cell and a second cell. In an aspect, for example, the base station 102, the controller/processor 375, and/or the TX processor 316 may execute the relative timing component 140 and/or the cell SFTD component 144 to determine, by the first cell (e.g., LTE cell 410), a cell level SFTD between the first cell and a second cell (e.g., NR cell 420). At least one UE 104 can be configured with dual connectivity with the first cell and the second cell. In some implementations, determining the cell level SFTD may be based on a received SFTD measurement result from a UE. In some implementations, determining the cell level SFTD may be based on an operator configuration. In some implementations, determining the cell level SFTD may be based on a default SFN reference time of the second cell. Accordingly, the base station 102, the controller/processor 375, and/or the TX processor 316 executing the relative timing component 140 and/or the cell SFTD component 144 may provide means for determining, by a first cell, a cell level SFTD between the first cell and a second cell.

At block 820, the method 800 may include sending an indication of the cell level SFTD to the second cell via a backhaul with the second cell. In an aspect, for example, the base station 102, the controller/processor 375, and/or the TX processor 316 may execute the relative timing component 140 and/or the cell SFTD component 144 to send an indication 450 of the cell level SFTD to the second cell via a backhaul with the second cell. For example, the indication 450 may include the cell level SFTD 452 or the SFN reference time 454. The cell level SFTD may be determined in block 810. The SFN reference time 454 may be determined based, at least in part, on a common synchronization source of the first cell and the second cell. In an aspect, at sub-block 822, the block 820 may include sending at least one of a setup request message, a setup response message, or a dual connectivity configuration update message. For example, sub-block 822 may include sending an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message. Accordingly, the base station 102, the controller/processor 375, and/or the TX processor 316 executing the relative timing component 140 and/or the cell SFTD component 144 may provide means for sending an indication of the cell level SFTD to the second cell via a backhaul with the second cell.

At block 830, the method 800 may optionally include determining, at the second cell, a SFN of the first cell based on the reference time. In an aspect, for example, the base station 102, the base station 704, the controller/processor 375, and/or the TX processor 316 may execute the relative timing component 140 and/or the cell SFTD component 144 to determine, at the second cell 420, a SFN of the first cell based on the SFN reference time. Accordingly, the base station 704, the controller/processor 375, and/or the TX processor 316 executing the relative timing component 140 and/or the cell SFTD component 144 at the second cell (e.g., base station 704) may provide means for determining, at the second cell, a SFN of the first cell based on the reference time.

At block 840, the method 800 may optionally include coordinating one or more of: measurement gap configuration, handover, resource coordination, or position determination based on the SFTD between the first cell and a second cell. In an aspect, for example, the base station 102, the controller/processor 375, and/or the TX processor 316 may execute the relative timing component 140 and/or the coordination component 720 to coordinate one or more of: measurement gap configuration, handover, resource coordination, or position determination based on the SFTD between the first cell and a second cell. Accordingly, the base station 102, the controller/processor 375, and/or the TX processor 316 executing the relative timing component 140 and/or the coordination component 720 may provide means for coordinating one or more of: measurement gap configuration, handover, resource coordination, or position determination based on the SFTD between the first cell and a second cell.

FIG. 9 is a flowchart of an example method 900 for communicating a UE SFTD measurement result between cells. The method 900 may be performed by one or more base stations (such as the base station 102, which may include the memory 376 and which may be the entire base station 102 or a component of the base station 102 such as the relative timing component 140, TX processor 316, the RX processor 370, or the controller/processor 375). The method 900 may be performed by the relative timing component 140 at a first cell in communication with a relative timing component 140 at a second cell.

At block 910, the method 900 may include receiving, by a first cell, a SFTD measurement between the first cell and a second cell from a UE that is configured with dual connectivity with the first cell and the second cell. In an aspect, for example, the base station 102, the controller/processor 375, and/or the TX processor 316 may execute the relative timing component 140 and/or the SFTD measurement component 142 to receive, by the first cell (e.g., LTE cell 410), a SFTD measurement 430 between the first cell and a second cell (e.g., NR cell 420) from a UE 104 that is configured with in dual connectivity with the first cell and the second cell. Accordingly, the base station 102, the controller/processor 375, and/or the TX processor 316 executing the relative timing component 140 and/or the SFTD measurement component 142 may provide means for receiving, by a first cell, a SFTD measurement between the first cell and a second cell from a UE that is configured with dual connectivity with the first cell and the second cell.

At block 920, the method 900 may include sending the SFTD measurement result and assistance information to the second cell via a backhaul to the second cell. In an aspect, for example, the base station 102, the controller/processor 375, and/or the TX processor 316 may execute the relative timing component 140 and/or the backhaul component 146 to send the SFTD measurement result 540 and assistance information 542 to the second cell (e.g., NR cell 420) via a backhaul (e.g., backhaul link 134) to the second cell. Accordingly, the base station 102, the controller/processor 375, and/or the TX processor 316 executing the relative timing component 140 and/or the SFTD measurement component 142 may provide means for sending the SFTD measurement result and assistance information to the second cell via a backhaul to the second cell.

At block 930, the method 900 may optionally include estimating, by the second cell, a cell level SFTD between the first cell and the second cell based on the SFTD measurement result and the assistance information. In an aspect, for example, the base station 102, the base station 704, the controller/processor 375, and/or the TX processor 316 may execute the relative timing component 140 and/or the SFTD measurement component 142 at the second cell (e.g., base station 704) to estimate a cell level SFTD between the first cell and the second cell based on the SFTD measurement result 540 and the assistance information 542. For example, the assistance information includes one or more of: a SSB identifier used for the SFTD measurement, a TRP location, an angle of arrival used for the SFTD measurement, a timing advance of the UE, a SRS configuration of the UE, or a PRS configuration of the UE. Accordingly, the base station 704, the controller/processor 375, and/or the TX processor 316 executing the relative timing component 140 and/or the SFTD measurement component 142 may provide means for estimating, by the second cell, a cell level SFTD between the first cell and the second cell based on the SFTD measurement result and the assistance information.

In some implementations, the method 900 may further include the block 840 of method 800.

FIG. 10 is a flowchart of an example method 1000 for determining a cell level SFTD using a positioning network entity. The method 1000 may be performed by one or more base stations (such as the base station 102, which may include the memory 376 and which may be the entire base station 102 or a component of the base station 102 such as the relative timing component 140, TX processor 316, the RX processor 370, or the controller/processor 375). The method 1000 may be performed by the relative timing component 140 at a first cell in communication with a relative timing component 140 at a second cell and a positioning network entity 610.

At block 1010, the method 1000 may include optionally include receiving, by a first cell, a SFTD measurement result between the first cell and a second cell from a UE. In an aspect, for example, the base station 102, the controller/processor 375, and/or the TX processor 316 may execute the relative timing component 140 and/or the SFTD measurement component 142 to receive, by the first cell (e.g., LTE cell 410), a SFTD measurement 430 between the first cell and a second cell (e.g., NR cell 420) from a UE 104. Accordingly, the base station 704, the controller/processor 375, and/or the TX processor 316 executing the relative timing component 140 and/or the SFTD measurement component 142 may provide means for receiving, by a first cell, a SFTD measurement result between the first cell and a second cell from a UE.

At block 1020, the method 1000 may include receiving, at a positioning network entity from a first cell, a SFTD measurement result between the first cell and a second cell generated by a UE. In an aspect, for example, the positioning network entity 610 may receive, from a first cell (e.g., LTE cell 410), the SFTD measurement result between the first cell and a second cell generated by the UE 104. In some implementations, the positioning network entity 610 is a location management function/component (LMF/LMC). In some implementations, the network entity is an evolved serving mobile location center (E-SMLC). Reporting the SFTD measurement result to the positioning network entity may include reporting via long term evolution (LTE) positioning protocol (LPP) signaling. Accordingly, the positioning network entity 610 may provide means for reporting the SFTD measurement to a positioning network entity.

At block 1030, the method 1000 may include determining, by the positioning network entity, a cell level SFTD between the first cell and the second cell based at least in part on the SFTD measurement and positioning information for the UE. In an aspect, for example, the positioning network entity 610 may determine a cell level SFTD between the first cell and the second cell based at least in part on the SFTD measurement result 640 and positioning information for the UE 104. Accordingly, the positioning network entity 610 may provide means for determining a cell level SFTD between the first cell and the second cell based at least in part on the SFTD measurement and positioning information for the UE.

At block 1040, the method 1000 may include sending the cell level SFTD from the positioning network entity to the second cell. In an aspect, for example, the positioning network entity 610 may send the cell level SFTD from the positioning network entity to the second cell. In some implementations (e.g., where the positioning network entity 610 is a LMF/LMC), sending the cell level SFTD may include sending the cell level SFTD via new radio (NR) positioning protocol A (NRPPa) signaling. In some implementations (e.g., where the positioning network entity 610 is a E-SMLC), sending the cell level SFTD may include sending the cell level SFTD via LTE positioning protocol A (LPPa) signaling. Accordingly, the positioning network entity 610 may provide means for sending the cell level SFTD from the positioning network entity to the second cell.

In some implementations, the method 1000 may further include the block 840 of method 800.

FIG. 11 is a flowchart of an example method 1100 for communicating an indication of a cell level SFN reference time. The method 1100 may be performed by one or more base stations (such as the base station 102, which may include the memory 376 and which may be the entire base station 102 or a component of the base station 102 such as the relative timing component 140, TX processor 316, the RX processor 370, or the controller/processor 375). The method 1100 may be performed by the relative timing component 140 at a first cell in communication with a relative timing component 140 at a second cell.

At block 1110, the method 1100 may include determining, by a first cell, a cell level SNF reference time for the first cell. In an aspect, for example, the base station 102, the controller/processor 375, and/or the TX processor 316 may execute the relative timing component 140 and/or the cell SFTD component 144 to determine, by the first cell, a cell level SFN reference time for the first cell. At least one UE 104 can be configured with dual connectivity with the first cell and the second cell. The SFN reference time 454 may be determined based, at least in part, on a common synchronization source of the first cell and the second cell. For instance, the common synchronization source may be a satellite based navigation system. In some implementations, the SFN reference time may be relative to a common reference time. For instance, determining the cell level SFN reference time may be based on a default SFN reference time. In some implementations, the SFN reference time may be an offset between the SFN 0 of the first cell and the common reference time according to the common synchronization source. Accordingly, the base station 102, the controller/processor 375, and/or the TX processor 316 executing the relative timing component 140 and/or the cell SFTD component 144 may provide means for determining, by a first cell, a cell level SFTD between the first cell and a second cell.

At block 1120, the method 1100 may include sending an indication of the cell level SFN reference time to the second cell via a backhaul with the second cell. In an aspect, for example, the base station 102, the controller/processor 375, and/or the TX processor 316 may execute the relative timing component 140 and/or the cell SFTD component 144 to send an indication 450 of the cell level SFN reference time to the second cell via a backhaul with the second cell. For example, the indication 450 may include the cell level SFN reference time 454. In an aspect, at sub-block 1122, the block 1120 may include sending at least one of a setup request message, a setup response message, or a dual connectivity configuration update message. For example, sub-block 1122 may include sending an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message. Accordingly, the base station 102, the controller/processor 375, and/or the TX processor 316 executing the relative timing component 140 and/or the cell SFTD component 144 may provide means for sending an indication of the cell level SFTD to the second cell via a backhaul with the second cell.

At block 1130, the method 1100 may optionally include determining, at the second cell, a SFN of the first cell based on the reference time. In an aspect, for example, the base station 102, the base station 704, the controller/processor 375, and/or the TX processor 316 may execute the relative timing component 140 and/or the cell SFTD component 144 to determine, at the second cell 420, a SFN of the first cell based on the SFN reference time. Accordingly, the base station 704, the controller/processor 375, and/or the TX processor 316 executing the relative timing component 140 and/or the cell SFTD component 144 at the second cell (e.g., base station 704) may provide means for determining, at the second cell, a SFN of the first cell based on the reference time.

At block 1140, the method 1100 may optionally include coordinating one or more of: measurement gap configuration, handover, resource coordination, or position determination based on the SFTD between the first cell and a second cell. In an aspect, for example, the base station 102, the controller/processor 375, and/or the TX processor 316 may execute the relative timing component 140 and/or the coordination component 720 to coordinate one or more of: measurement gap configuration, handover, resource coordination, or position determination based on the SFTD between the first cell and a second cell. Accordingly, the base station 102, the controller/processor 375, and/or the TX processor 316 executing the relative timing component 140 and/or the coordination component 720 may provide means for coordinating one or more of: measurement gap configuration, handover, resource coordination, or position determination based on the SFTD between the first cell and a second cell.

SOME FURTHER EXAMPLE CLAUSES

Implementation examples are described in the following numbered clauses:

1. A method of wireless communication, comprising:
   determining, by a first cell, a cell level system frame number (SFN) and frame timing difference (SFTD) between the first cell and a second cell, wherein at least one user equipment (UE) can be configured with dual connectivity with the first cell and the second cell; and
   sending an indication of the cell level SFTD to the second cell via a backhaul with the second cell.

2. The method of clause 1, wherein sending the indication of the cell level SFTD comprises sending at least one of a setup request message, a setup response message, or a dual connectivity configuration update message.

3. The method of clause 2, wherein sending the indication of the cell level SFTD comprises sending an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

4. The method of any of clauses 1-3, wherein the indication of the cell level SFTD is the determined cell level SFTD.

5. The method of any of clauses 1-4, wherein determining the cell level SFTD between the first cell and the second cell is based on a SFN reference time for the second cell.

6. The method of any of clauses 1-4, wherein determining the cell level SFTD between the first cell and the second cell comprises receiving a SFTD measurement result between the first cell and the second cell from the at least one UE.

7. The method of any of clauses 1-6, further comprising coordinating one or more of: measurement gap configuration, handover, resource coordination, or position determination based on the cell level SFTD between the first cell and the second cell.

8. A method of wireless communication, comprising:
determining, by a first cell, a cell level system frame number (SFN) reference time for the first cell, and
sending an indication of the cell level SFN reference time to a second cell via a backhaul with the second cell, wherein at least one user equipment (UE) can be configured with dual connectivity with the first cell and the second cell.

9. The method of clause 8, wherein sending the indication of the cell level SFN reference time comprises sending at least one of a setup request message, a setup response message, or a dual connectivity configuration update message.

10. The method of clause 9, wherein sending the indication of the cell level SFN reference time comprises sending an information element for the SFN reference time in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

11. The method of any of clauses 8-10, wherein the SFN reference time is determined based, at least in part, on a common synchronization source of the first cell and the second cell.

12. The method of clause 11, wherein the common synchronization source is a satellite based navigation system.

13. The method of clause 11, wherein the SFN reference time is relative to a common reference time.

14. The method of any of clauses 8-13, further comprising determining, at the second cell, a SFN of the first cell based on the SFN reference time.

15. The method of any of clauses 8-13, further comprising coordinating one or more of: measurement gap configuration, handover, resource coordination, or position determination based on a cell level SFN and frame timing difference (SFTD) between the first cell and the second cell.

16. An apparatus of a first cell for wireless communication, comprising:
a memory storing computer-executable instructions; and
at least one processor coupled to the memory and configured to execute the computer-executable instructions to:
determine a cell level system frame number (SFN) and frame timing difference (SFTD) between the first cell and a second cell, wherein at least one user equipment (UE) can be configured with dual connectivity with the first cell and the second cell; and
send an indication of the cell level SFTD to the second cell via a backhaul with the second cell.

17. The apparatus of clause 16, wherein the at least one processor is configured to send the indication of the cell level SFTD as at least one of a setup request message, a setup response message, or a dual connectivity configuration update message.

18. The apparatus of clause 17, wherein the at least one processor is configured to send the indication of the cell level SFTD as an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

19. The apparatus of any of clauses 16-18, wherein the indication of the cell level SFTD is the determined cell level SFTD.

20. The apparatus of any of clauses 16-19, wherein the at least one processor is configured to determine the cell level SFTD between the first cell and the second cell based on a SFN reference time for the second cell.

21. The apparatus of any of clauses 16-19, wherein the at least one processor is configured to determine the cell level SFTD between the first cell and the second cell based on a received SFTD measurement result between the first cell and the second cell from the at least one UE.

22. The apparatus of any of clauses 16-21, wherein the at least one processor is configured to coordinate one or more of: measurement gap configuration, handover, resource coordination, or position determination based on the cell level SFTD between the first cell and the second cell.

23. An apparatus of a first cell for wireless communication, comprising:
a memory storing computer-executable instructions; and
at least one processor coupled to the memory and configured to execute the computer-executable instructions to:
determine a cell level system frame number (SFN) reference time for the first cell, and
send an indication of the cell level SFN reference time to a second cell via a backhaul with the second cell, wherein at least one user equipment (UE) can be configured with dual connectivity with the first cell and the second cell.

24. The apparatus of clause 23, wherein the at least one processor is configured to send the indication of the cell level SFN reference time as at least one of a setup request message, a setup response message, or a dual connectivity configuration update message.

25. The apparatus of clause 24, wherein the at least one processor is configured to send the indication of the cell level SFN reference time as an information element in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

26. The apparatus of any of clauses 23-25, wherein the SFN reference time is determined based, at least in part, on a common synchronization source of the first cell and the second cell.

27. The apparatus of clause 26, wherein the common synchronization source is a satellite based navigation system.

28. The apparatus of clause 26, wherein the SFN reference time is relative to a common reference time.

29. The apparatus of any of clauses 23-28, wherein the at least one processor is configured to determine a SFN and frame timing difference (SFTD) between the first cell and the second cell based on the SFN reference time.

30. The apparatus of any of clauses 23-28, wherein the at least one processor is configured to coordinate one or more of: measurement gap configuration, handover, resource coordination, or position determination based on a cell level SFN and frame timing difference (SFTD) between the first cell and the second cell.

31. An apparatus of a first cell for wireless communication, comprising:
means for determining a cell level system frame number (SFN) and frame timing difference (SFTD) between the first cell and a second cell, wherein at least one user equipment (UE) can be configured with dual connectivity with the first cell and the second cell; and means for sending an indication of the cell level SFTD to the second cell via a backhaul with the second cell.

32. The apparatus of clause 31, wherein the means for sending the indication of the cell level SFTD is configured to send at least one of a setup request message, a setup response message, or a dual connectivity configuration update message.

33. The apparatus of clause 32, wherein the means for sending the indication of the cell level SFTD is configured to send an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

34. The apparatus of any of clauses 31-33, wherein the indication of the cell level SFTD is the determined cell level SFTD.

35. The apparatus of any of clauses 31-34, wherein the means for determining the cell level SFTD is configured to determine the cell level SFTD based on a SFN reference time for the second cell.

36. The apparatus of any of clauses 31-34, wherein the means for determining the cell level SFTD is configured to receive a SFTD measurement result between the first cell and the second cell from the at least one UE.

37. The apparatus of any of clauses 31-35, further comprising means for coordinating one or more of: measurement gap configuration, handover, resource coordination, or position determination based on the cell level SFTD between the first cell and the second cell.

38. An apparatus of a first cell for wireless communication, comprising:

means for determining a cell level system frame number (SFN) reference time for the first cell, and means for sending an indication of the cell level SFN reference time to a second cell via a backhaul with the second cell, wherein at least one user equipment (UE) can be configured with dual connectivity with the first cell and the second cell.

39. The apparatus of clause 38, wherein the means for sending the indication of the cell level SFN reference time is configured to send at least one of a setup request message, a setup response message, or a dual connectivity configuration update message.

40. The apparatus of clause 39, wherein the means for sending the indication of the cell level SFN reference time is configured to send an information element for the SFN reference time in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

41. The apparatus of any of clauses 38-40, wherein the SFN reference time is determined based, at least in part, on a common synchronization source of the first cell and the second cell.

42. The apparatus of clause 41, wherein the common synchronization source is a satellite based navigation system.

43. The apparatus of clause 41, wherein the SFN reference time is relative to a common reference time.

44. The apparatus of any of clauses 38-43, further comprising means for determining, at the second cell, a SFN of the first cell based on the SFN reference time.

45. The apparatus of any of clauses 38-43, further comprising means for coordinating one or more of: measurement gap configuration, handover, resource coordination, or position determination based on a cell level SFN and frame timing difference (SFTD) between the first cell and the second cell.

46. A non-transitory computer-readable medium storing computer executable code, the code when executed by a processor causes the processor to:

determine, at a first cell, a cell level system frame number (SFN) and frame timing difference (SFTD) between the first cell and a second cell, wherein at least one user equipment (UE) can be configured with dual connectivity with the first cell and the second cell; and send an indication of the cell level SFTD to the second cell via a backhaul with the second cell.

47. The non-transitory computer-readable medium of clause 46, wherein the code to send the indication of the cell level SFTD includes code to send the indication of the cell level SFTD as at least one of a setup request message, a setup response message, or a dual connectivity configuration update message.

48. The non-transitory computer-readable medium of clause 47, wherein the code to send the indication of the cell level SFTD includes code to send the indication of the cell level SFTD as an information element for the SFTD in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

49. The non-transitory computer-readable medium of any of clauses 46-48, wherein the indication of the cell level SFTD is the determined cell level SFTD.

50. The non-transitory computer-readable medium of any of clauses 46-49, wherein the code determine the cell level SFTD includes code to determine the cell level SFTD between the first cell and the second cell based on a SFN reference time for the second cell.

51. The non-transitory computer-readable medium of any of clauses 46-49, wherein the at least one processor is configured to determine the cell level SFTD between the first cell and the second cell based on a received SFTD measurement result between the first cell and the second cell from the at least one UE.

52. The non-transitory computer-readable medium of any of clauses 46-51, wherein the at least one processor is configured to coordinate one or more of: measurement gap configuration, handover, resource coordination, or position determination based on the cell level SFTD between the first cell and the second cell.

53. A non-transitory computer-readable medium storing computer executable code, the code when executed by a processor causes the processor to:

determine, at a first cell, a cell level system frame number (SFN) reference time for the first cell, and send an indication of the cell level SFN reference time to a second cell via a backhaul with the second cell, wherein at least one user equipment (UE) can be configured with dual connectivity with the first cell and the second cell.

54. The non-transitory computer-readable medium of clause 53, wherein the at least one processor is configured to send the indication of the cell level SFN reference time as at least one of a setup request message, a setup response message, or a dual connectivity configuration update message.

55. The non-transitory computer-readable medium of clause 54, wherein the at least one processor is configured to send the indication of the cell level SFN reference time as an information element in one or more of a EN-DC X2 SETUP REQUEST message, an EN-DC X2 SETUP RESPONSE message, a EN-DC CONFIGURATION UPDATE message, an XN REQUEST message, an XN SETUP RESPONSE message, or an XN CONFIGURATION UPDATE message.

56. The non-transitory computer-readable medium of any of clauses 53-55, wherein the SFN reference time is determined based, at least in part, on a common synchronization source of the first cell and the second cell.

57. The non-transitory computer-readable medium of clause 56, wherein the common synchronization source is a satellite based navigation system.

58. The non-transitory computer-readable medium of clause 56, wherein the SFN reference time is relative to a common reference time.

59. The non-transitory computer-readable medium of any of clauses 53-58, wherein the at least one processor is configured to determine a SFN and frame timing difference (SFTD) between the first cell and the second cell based on the SFN reference time.

60. The non-transitory computer-readable medium of any of clauses 53-59, wherein the at least one processor is configured to coordinate one or more of: measurement gap configuration, handover, resource coordination, or position determination based on a cell level SFN and frame timing difference (SFTD) between the first cell and the second cell.

61. A method of wireless communication, comprising:
receiving, by a first cell, a system frame number (SFN) and frame timing difference (SFTD) measurement result between the first cell and a second cell from a user equipment (UE) that can be configured with dual connectivity with the first cell and the second cell; and
sending the SFTD measurement result and assistance information to the second cell via a backhaul to the second cell.

62. The method of clause 61, wherein the assistance information includes one or more of: a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE.

63. The method of clause 61 or 62, further comprising estimating, by the second cell, a cell level SFTD between the first cell and the second cell based on the SFTD measurement result and the assistance information.

64. An apparatus for wireless communication, comprising:
a memory storing computer-executable instructions; and
at least one processor coupled to the memory and configured to execute the computer-executable instructions to:
receive, by a first cell, a system frame number (SFN) and frame timing difference (SFTD) measurement result between the first cell and a second cell from a user equipment (UE) that can be configured with dual connectivity with the first cell and the second cell; and
send the SFTD measurement result and assistance information to the second cell via a backhaul to the second cell.

65. The apparatus of clause 64, wherein the assistance information includes one or more of: a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE.

66. The apparatus of clause 64 or 65, wherein the at least one processor is configured to estimate a cell level SFTD between the first cell and the second cell based on the SFTD measurement result and the assistance information.

67. An apparatus for wireless communication, comprising:
means for receiving, by a first cell, a system frame number (SFN) and frame timing difference (SFTD) measurement result between the first cell and a second cell from a user equipment (UE) that can be configured with dual connectivity with the first cell and the second cell; and
means for sending the SFTD measurement result and assistance information to the second cell via a backhaul to the second cell.

68. The apparatus of clause 67, wherein the assistance information includes one or more of: a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE.

69. The apparatus of clause 67 or 68, further comprising means for estimating a cell level SFTD between the first cell and the second cell based on the SFTD measurement result and the assistance information.

70. A non-transitory computer-readable medium storing computer executable code, the code when executed by a processor causes the processor to:
receive, by a first cell, a system frame number (SFN) and frame timing difference (SFTD) measurement result between the first cell and a second cell from a user equipment (UE) that can be configured with dual connectivity with the first cell and the second cell; and
send the SFTD measurement result and assistance information to the second cell via a backhaul to the second cell.

71. The non-transitory computer-readable medium of clause 70, wherein the assistance information includes one or more of: a synchronization signal block (SSB) identifier used for the SFTD measurement, a transmission-reception point (TRP) location, an angle of arrival used for the SFTD measurement, a timing advance of the UE, a sounding reference signal (SRS) configuration of the UE, or a position reference signal (PRS) configuration of the UE.

72. The non-transitory computer-readable medium of clause 70 or 71, further comprising code to estimate a cell level SFTD between the first cell and the second cell based on the SFTD measurement result and the assistance information.

73. A method of wireless communication, comprising:
receiving, at a positioning network entity from a first cell, a system frame number (SFN) and frame timing difference (SFTD) measurement result between the first cell and a second cell generated by a user equipment (UE);
determining, by the positioning network entity, a cell level SFTD between the first cell and the second cell based at least in part on the SFTD measurement result and positioning information for the UE; and
sending the cell level SFTD from the positioning network entity to the second cell.

74. The method of clause 73, wherein the positioning network entity is a location management function/component (LMF/LMC), wherein reporting the SFTD measurement comprises reporting via long term evolution (LTE) positioning protocol (LPP) signaling, and wherein sending the cell level SFTD comprises sending the cell level SFTD via new radio (NR) positioning protocol A (NRPPa) signaling.

75. The method of clause 73 or 74, wherein the positioning network entity is an evolved serving mobile location center (E-SMLC), wherein reporting the SFTD measurement comprises reporting via long term evolution (LTE) positioning protocol (LPP) signaling, and wherein sending the cell level SFTD comprises sending the cell level SFTD via LTE positioning protocol A (LPPa) signaling.

76. An apparatus for wireless communication, comprising:

a memory storing computer-executable instructions; and at least one processor coupled to the memory and configured to execute the computer-executable instructions to:

receive, at a positioning network entity from a first cell, a system frame number (SFN) and frame timing difference (SFTD) measurement result between the first cell and a second cell generated by a user equipment (UE);

determine, by the positioning network entity, a cell level SFTD between the first cell and the second cell based at least in part on the SFTD measurement result and positioning information for the UE; and send the cell level SFTD from the positioning network entity to the second cell.

77. The apparatus of clause 76, wherein the positioning network entity is a location management function/component (LMF/LMC), wherein the at least one processor is configured to report the SFTD measurement via long term evolution (LTE) positioning protocol (LPP) signaling, and send the cell level SFTD via new radio (NR) positioning protocol A (NRPPa) signaling.

78. The apparatus of clause 76, wherein the positioning network entity is an evolved serving mobile location center (E-SMLC), wherein the at least one processor is configured to report the SFTD measurement via long term evolution (LTE) positioning protocol (LPP) signaling, and send the cell level SFTD via LTE positioning protocol A (LPPa) signaling.

79. An apparatus for wireless communication, comprising:

means for receiving, at a positioning network entity from a first cell, a system frame number (SFN) and frame timing difference (SFTD) measurement result between the first cell and a second cell generated by a user equipment (UE);

means for determining, by the positioning network entity, a cell level SFTD between the first cell and the second cell based at least in part on the SFTD measurement result and positioning information for the UE; and means for sending the cell level SFTD from the positioning network entity to the second cell.

80. The apparatus of clause 79, wherein the positioning network entity is a location management function/component (LMF/LMC), wherein the means for reporting the SFTD measurement is configured to report via long term evolution (LTE) positioning protocol (LPP) signaling, and wherein the means for sending the cell level SFTD is configured to send the cell level SFTD via new radio (NR) positioning protocol A (NRPPa) signaling.

81. The apparatus of clause 79, wherein the positioning network entity is an evolved serving mobile location center (E-SMLC), wherein the means for reporting the SFTD measurement is configured to report via long term evolution (LTE) positioning protocol (LPP) signaling, and wherein the means for sending the cell level SFTD is configured to send the cell level SFTD via LTE positioning protocol A (LPPa) signaling.

82. A non-transitory computer-readable medium storing computer executable code, the code when executed by a processor causes the processor to:

receive, at a positioning network entity from a first cell, a system frame number (SFN) and frame timing difference (SFTD) measurement result between the first cell and a second cell generated by a user equipment (UE);

determine, by the positioning network entity, a cell level SFTD between the first cell and the second cell based at least in part on the SFTD measurement result and positioning information for the UE; and send the cell level SFTD from the positioning network entity to the second cell.

83. The non-transitory computer-readable medium of clause 82, wherein the positioning network entity is a location management function/component (LMF/LMC), wherein the code to report the SFTD measurement is configured to report via long term evolution (LTE) positioning protocol (LPP) signaling, and wherein the code to send the cell level SFTD is configured to send the cell level SFTD via new radio (NR) positioning protocol A (NRPPa) signaling.

84. The non-transitory computer-readable medium of clause 82, wherein the positioning network entity is an evolved serving mobile location center (E-SMLC), wherein the code to report the SFTD measurement is configured to report via long term evolution (LTE) positioning protocol (LPP) signaling, and wherein the code to send the cell level SFTD is configured to send the cell level SFTD via LTE positioning protocol A (LPPa) signaling.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
determining, by a first cell, a cell level system frame number (SFN) and frame timing difference (SFTD) between the first cell and a second cell; and
communicating, via a backhaul with the second cell, a message including an indication of the cell level SFTD, wherein the message is a setup request message, a setup response message, or a dual connectivity configuration update message, wherein the indication comprises an information element, and wherein:
the setup request message is an EN-DC X2 SETUP REQUEST message or an XN REQUEST message,
the setup response message is an EN-DC X2 SETUP RESPONSE message or an XN SETUP RESPONSE message, or
the dual connectivity configuration update message is an EN-DC CONFIGURATION UPDATE message or an XN CONFIGURATION UPDATE message.

2. The method of claim 1, wherein the indication of the cell level SFTD is the determined cell level SFTD.

3. The method of claim 1, wherein determining the cell level SFTD between the first cell and the second cell is based on a SFN reference time for the second cell.

4. The method of claim 1, wherein determining the cell level SFTD between the first cell and the second cell comprises receiving a SFTD measurement result between the first cell and the second cell from the at least one UE.

5. The method of claim 1, further comprising coordinating one or more of:
measurement gap configuration, handover, resource coordination, or position determination based on the cell level SFTD between the first cell and the second cell.

6. A first cell for wireless communication, comprising:
a processing system configured to:
determine a cell level system frame number (SFN) reference time; and
communicate, via a backhaul with a second cell, a message including an indication of the cell level SFN reference time, wherein the message is a setup request message, wherein the indication comprises an information element, and wherein the setup request message is an EN-DC X2 SETUP REQUEST message or an XN REQUEST message.

7. The first cell of claim 6, wherein, to determine the cell level SFN reference time, the processing system is configured to determine the cell level SFN reference time based, at least in part, on a common synchronization source of the first cell and the second cell.

8. The apparatus of claim 7, wherein the common synchronization source is a satellite-based navigation system.

9. The first cell of claim 7, wherein the cell level SFN reference time is relative to a common reference time.

10. The first cell of claim 6, wherein the processing system is configured to determine a SFN and frame timing difference (SFTD) between the first cell and the second cell based on the cell level SFN reference time.

11. The first cell of claim 6, wherein the processing system is configured to coordinate one or more of: measurement gap configuration, handover, resource coordination, or position determination based on a cell level SFN and frame timing difference (SFTD) between the first cell and the second cell.

12. The first cell of claim 6, wherein the setup request message is the EN-DC X2 SETUP REQUEST message.

13. The first cell of claim 6, wherein the setup request message is the XN REQUEST message.

14. A first cell for wireless communication, comprising:
a processing system configured to:
determine a cell level system frame number (SFN) reference time; and
communicate, via a backhaul with a second cell, a message including an indication of the cell level SFN reference time, wherein the message is a setup response message, wherein the indication comprises an information element, and wherein the setup response message is an EN-DC X2 SETUP RESPONSE message or an XN SETUP RESPONSE message.

15. The first cell of claim 14, wherein the setup response message is the EN-DC X2 SETUP RESPONSE message.

16. The first cell of claim 14, wherein the setup response message is the XN SETUP RESPONSE message.

17. A first cell for wireless communication, comprising:
a processing system configured to:
determine a cell level system frame number (SFN) reference time; and
communicate, via a backhaul with a second cell, a message including an indication of the cell level SFN reference time, wherein the message is a dual connectivity configuration update message, wherein the indication comprises an information element, and wherein the dual connectivity configuration update message is an EN-DC CONFIGURATION UPDATE message or an XN CONFIGURATION UPDATE message.

18. The first cell of claim 17, wherein the dual connectivity configuration update message is the EN-DC CONFIGURATION UPDATE message.

19. The first cell of claim 17, wherein the dual connectivity configuration update message is the XN CONFIGURATION UPDATE message.

20. The first cell of claim 6, wherein, to communicate the message, the processing system is configured to receive the message.

21. The first cell of claim 6, wherein, to communicate the message, the processing system is configured to transmit the message.

22. A first cell for wireless communication, comprising:
a processing system configured to:
determine a cell level system frame number (SFN) reference time; and
communicate, via a backhaul with a second cell, a message including an indication of the cell level SFN reference time, wherein the message is a setup request message, a setup response message, or a dual connectivity configuration update message, and wherein the cell level SFN reference time is an offset between an SFN 0 and a common reference time of 1980-01-06 T00: 00:19 in international atomic time (TAI).

23. A first cell for wireless communication, comprising:
a processing system configured to:
   determine a cell level system frame number (SFN) reference time, wherein the cell level SFN reference time is an offset between an SFN 0 and a common reference time of 1980-01-06 T00: 00:19 in international atomic time (TAI); and
   communicate, via a backhaul with a second cell, a setup request message including an information element that indicates the cell level SFN reference time.

24. The first cell of claim 23, wherein the setup request message is an EN-DC X2 SETUP REQUEST message.

25. The first cell of claim 23, and wherein the setup request message is an XN REQUEST message.

26. A first cell for wireless communication, comprising:
a processing system configured to:
   determine a cell level system frame number (SFN) reference time, wherein the cell level SFN reference time is an offset between an SFN 0 and a common reference time of 1980-01-06 T00: 00:19 in international atomic time (TAI); and
   communicate, via a backhaul with a second cell, a setup response message including an information element that indicates the cell level SFN reference time.

27. The first cell of claim 26, wherein the setup response message is an EN-DC X2 SETUP RESPONSE message.

28. The first cell of claim 26, wherein the setup response message is an XN SETUP RESPONSE message.

* * * * *